United States Patent
Zurek-Terhardt et al.

(10) Patent No.: US 8,982,745 B2
(45) Date of Patent: Mar. 17, 2015

(54) METHOD FOR IMPROVING THE DATA RATE OF MOBILE/HANDHELD DATA AND THE QUALITY OF CHANNEL ESTIMATION IN AN ATSC-M/H TRANSPORT DATA STREAM

(75) Inventors: Günther Zurek-Terhardt, Schöneiche (DE); Torsten Görig, Berlin (DE); Jens Rusch-Ihwe, Brandenburg an der Havel (DE); Denis Hagemeier, Berlin (DE); Michael Simon, Frederick, MD (US)

(73) Assignee: Rohde & Schwarz GmbH & Co. KG, Munich (DE)

(*) Notice: Subject to any disclaimer, the term of this patent is extended or adjusted under 35 U.S.C. 154(b) by 314 days.

(21) Appl. No.: 12/727,478

(22) Filed: Mar. 19, 2010

(65) Prior Publication Data
US 2010/0238916 A1 Sep. 23, 2010

Related U.S. Application Data

(60) Provisional application No. 61/162,275, filed on Mar. 21, 2009, provisional application No. 61/265,572, filed on Dec. 1, 2009.

(51) Int. Cl.
*H04B 3/20* (2006.01)
*H04L 25/02* (2006.01)
(Continued)

(52) U.S. Cl.
CPC ........... *H04L 25/0226* (2013.01); *H04H 20/42* (2013.01); *H04H 20/57* (2013.01); *H04L 1/0041* (2013.01); *H04L 1/0083* (2013.01); *H04N 21/23608* (2013.01); *H04N 21/4344* (2013.01)
USPC ........... 370/292; 370/312; 370/349; 714/776; 714/792; 375/265

(58) Field of Classification Search
None
See application file for complete search history.

(56) References Cited

U.S. PATENT DOCUMENTS

| 5,073,980 A | 12/1991 | Prucnal et al. |
|---|---|---|
| 5,216,503 A | 6/1993 | Paik et al. |

(Continued)

FOREIGN PATENT DOCUMENTS

| DE | 199 60 295 | 6/2001 |
|---|---|---|
| DE | 196 17 293 | 11/2001 |

(Continued)

OTHER PUBLICATIONS

ATSC Digital Television Standard (A/53), "Annex D: RF/Transmission Systems Characteristics", Sep. 16, 1995, pp. 46-60.
(Continued)

*Primary Examiner* — Jackie Zuniga Abad
(74) *Attorney, Agent, or Firm* — Fitzpatrick, Cella, Harper & Scinto

(57) ABSTRACT

A method for improving the data rate of data for M/H receivers and for improving the quality of channel estimation in an ATSC-M/H transport data stream marks the transport data packets determined for the transmission of data for M/H receivers in N (e.g., 38) consecutively transmitted transport data packets in an ATSC-M/H-slot of the uncoded ATSC-M/H transport data stream originally determined for the transmission of data for stationary receivers. Coded data for M/H receivers are inserted in the marked transport data packets and introduce training sequences in segments of data fields of the coded ATSC-M/H transport data stream containing marked transport data packets.

13 Claims, 4 Drawing Sheets

(51) Int. Cl.
*H04H 20/42* (2008.01)
*H04H 20/57* (2008.01)
*H04L 1/00* (2006.01)
*H04N 21/236* (2011.01)
*H04N 21/434* (2011.01)

(56) References Cited

U.S. PATENT DOCUMENTS

| | | |
|---|---|---|
| 5,506,844 A | 4/1996 | Rao |
| 5,614,914 A | 3/1997 | Bolgiano et al. |
| 5,835,493 A | 11/1998 | Magee et al. |
| 5,903,574 A | 5/1999 | Lyons |
| 6,005,605 A | 12/1999 | Kostreski et al. |
| 6,088,337 A | 7/2000 | Eastmond et al. |
| 6,118,797 A | 9/2000 | O'Shea |
| 6,130,898 A | 10/2000 | Kostreski et al. |
| 6,192,070 B1 | 2/2001 | Poon et al. |
| 6,269,092 B1 | 7/2001 | Schilling |
| 6,313,885 B1 | 11/2001 | Patel et al. |
| 6,324,186 B1 | 11/2001 | Mahn |
| 6,335,766 B1 | 1/2002 | Twitchell et al. |
| 6,414,720 B1 | 7/2002 | Tsukidate et al. |
| 6,477,180 B1 | 11/2002 | Aggarwal et al. |
| 6,480,236 B1 | 11/2002 | Limberg |
| 6,496,477 B1 | 12/2002 | Perkins et al. |
| 6,507,618 B1 | 1/2003 | Wee et al. |
| 6,580,705 B1 | 6/2003 | Riazi et al. |
| 6,631,491 B1 | 10/2003 | Shibutani et al. |
| 6,640,239 B1 | 10/2003 | Gidwani |
| 6,678,260 B2 | 1/2004 | Proctor, Jr. |
| 6,717,933 B1 | 4/2004 | Sonning et al. |
| 6,721,337 B1 | 4/2004 | Kroeger et al. |
| 6,727,847 B2 | 4/2004 | Rabinowitz et al. |
| 6,728,467 B2 | 4/2004 | Oshima |
| 6,744,789 B1 | 6/2004 | Michener |
| 6,772,434 B1 | 8/2004 | Godwin |
| 6,801,499 B1 | 10/2004 | Anandakumar et al. |
| 6,804,223 B2 | 10/2004 | Hoffmann et al. |
| 6,816,204 B2 | 11/2004 | Limberg |
| 6,861,964 B2 | 3/2005 | Breti et al. |
| 6,862,707 B2 | 3/2005 | Shin |
| 6,879,720 B2 | 4/2005 | Sarachik et al. |
| 6,930,983 B2 | 8/2005 | Perkins et al. |
| 6,934,312 B2 | 8/2005 | Takeuchi et al. |
| 6,996,133 B2 | 2/2006 | Bretl et al. |
| 7,110,048 B2 | 9/2006 | Weiss |
| 7,111,221 B2 | 9/2006 | Birru et al. |
| 7,197,685 B2 | 3/2007 | Limberg |
| 7,310,354 B2 | 12/2007 | Fimoff et al. |
| 7,324,545 B2 | 1/2008 | Chuah et al. |
| 7,336,646 B2 | 2/2008 | Muller |
| 7,349,675 B2 | 3/2008 | Karr et al. |
| 7,382,838 B2 | 6/2008 | Peting |
| 7,496,094 B2 | 2/2009 | Gopinath et al. |
| 7,532,677 B2 | 5/2009 | Simon |
| 7,532,857 B2 | 5/2009 | Simon |
| 7,539,247 B2 | 5/2009 | Choi et al. |
| 7,551,675 B2 | 6/2009 | Kroeger |
| 7,554,912 B2 | 6/2009 | Rodriguez-Sanchez et al. |
| 7,558,279 B2 | 7/2009 | Hwang et al. |
| 7,564,905 B2 | 7/2009 | Park et al. |
| 7,593,474 B2 | 9/2009 | Jeong et al. |
| 7,599,348 B2 | 10/2009 | Kang et al. |
| 7,602,749 B2 | 10/2009 | Proctor, Jr. |
| 7,626,960 B2 | 12/2009 | Muller |
| 7,667,780 B2 | 2/2010 | Weiss |
| 7,668,250 B2 | 2/2010 | Limberg |
| 7,672,399 B2 | 3/2010 | Simon |
| 7,702,337 B2 | 4/2010 | Vare et al. |
| 7,715,489 B2 | 5/2010 | Zeng |
| 7,715,491 B2 | 5/2010 | Yu et al. |
| 7,733,819 B2 | 6/2010 | Lee et al. |
| 7,738,582 B2 | 6/2010 | Simon |
| 7,773,684 B2 | 8/2010 | Jeong et al. |
| 7,779,327 B2 | 8/2010 | Lee et al. |
| 7,783,316 B1 | 8/2010 | Mitchell |
| 7,801,181 B2 | 9/2010 | Song et al. |
| 7,804,909 B2 | 9/2010 | Choi et al. |
| 7,822,134 B2 | 10/2010 | Kim et al. |
| 7,822,139 B2 | 10/2010 | Simon |
| 7,830,974 B2 | 11/2010 | Choi et al. |
| 7,852,961 B2 | 12/2010 | Chang et al. |
| 7,856,590 B2 | 12/2010 | Kim et al. |
| 7,890,047 B2 | 2/2011 | Kidd et al. |
| 7,933,351 B2 | 4/2011 | Kim et al. |
| 7,953,160 B2 | 5/2011 | Gordon et al. |
| 8,009,662 B2 | 8/2011 | Lee et al. |
| 2001/0017849 A1 | 8/2001 | Campanella et al. |
| 2002/0085548 A1 | 7/2002 | Ku et al. |
| 2003/0032389 A1 | 2/2003 | Kim et al. |
| 2003/0053493 A1 | 3/2003 | Graham Mobley et al. |
| 2003/0099303 A1 | 5/2003 | Birru et al. |
| 2003/0100267 A1 | 5/2003 | Itoh et al. |
| 2003/0128826 A1 | 7/2003 | Benini et al. |
| 2003/0206596 A1 | 11/2003 | Carver et al. |
| 2005/0013249 A1 | 1/2005 | Kong et al. |
| 2005/0044475 A1* | 2/2005 | Yedidia et al. .............. 714/801 |
| 2005/0084023 A1 | 4/2005 | Bott et al. |
| 2005/0147186 A1 | 7/2005 | Funamoto et al. |
| 2005/0207416 A1 | 9/2005 | Rajkotia |
| 2005/0238100 A1 | 10/2005 | Hsiao et al. |
| 2005/0249301 A1 | 11/2005 | Jeong et al. |
| 2006/0002464 A1 | 1/2006 | Choi et al. |
| 2006/0023656 A1 | 2/2006 | Anglin |
| 2006/0050770 A1 | 3/2006 | Wallace et al. |
| 2006/0067266 A1 | 3/2006 | Ehlers et al. |
| 2006/0093045 A1 | 5/2006 | Anderson et al. |
| 2006/0126556 A1 | 6/2006 | Jiang et al. |
| 2006/0211436 A1 | 9/2006 | Paila et al. |
| 2006/0245516 A1 | 11/2006 | Simon |
| 2007/0066272 A1 | 3/2007 | Vassiliou et al. |
| 2007/0074267 A1 | 3/2007 | Clerget et al. |
| 2007/0091857 A1 | 4/2007 | Elstermann |
| 2007/0143810 A1 | 6/2007 | Yousef |
| 2007/0174880 A1 | 7/2007 | Fite et al. |
| 2007/0230460 A1 | 10/2007 | Jeong et al. |
| 2008/0056219 A1 | 3/2008 | Venkatachalam |
| 2008/0175148 A1* | 7/2008 | Todd et al. .................. 370/235 |
| 2008/0181112 A1 | 7/2008 | Beck et al. |
| 2008/0205215 A1 | 8/2008 | Kikuchi et al. |
| 2008/0211969 A1 | 9/2008 | Simon et al. |
| 2008/0239161 A1* | 10/2008 | Kim et al. .................... 348/720 |
| 2008/0247442 A1 | 10/2008 | Orlik et al. |
| 2008/0259835 A1 | 10/2008 | Venkatachalem et al. |
| 2008/0273698 A1 | 11/2008 | Manders et al. |
| 2009/0003432 A1 | 1/2009 | Liu et al. |
| 2009/0013356 A1 | 1/2009 | Doerr et al. |
| 2009/0016435 A1 | 1/2009 | Brandsma et al. |
| 2009/0034442 A1 | 2/2009 | Song et al. |
| 2009/0040962 A1 | 2/2009 | Oger et al. |
| 2009/0175355 A1* | 7/2009 | Gordon et al. ........... 375/240.25 |
| 2009/0193487 A1 | 7/2009 | Simon |
| 2009/0201997 A1 | 8/2009 | Kim et al. |
| 2009/0225872 A1 | 9/2009 | Simon |
| 2009/0228764 A1 | 9/2009 | Lee et al. |
| 2009/0228765 A1* | 9/2009 | Lee et al. ..................... 714/776 |
| 2009/0252266 A1 | 10/2009 | Heinemann et al. |
| 2009/0265751 A1 | 10/2009 | Limberg |
| 2010/0023972 A1 | 1/2010 | Summers et al. |
| 2010/0142446 A1 | 6/2010 | Schlicht et al. |
| 2010/0142447 A1 | 6/2010 | Schlicht et al. |
| 2010/0150182 A1* | 6/2010 | Noronha, Jr. ................. 370/537 |
| 2010/0246506 A1 | 9/2010 | Krishnaswamy |
| 2010/0254449 A1 | 10/2010 | Rusch-Ihwe |
| 2011/0170015 A1* | 7/2011 | Kim et al. .................... 348/731 |

FOREIGN PATENT DOCUMENTS

| | | |
|---|---|---|
| DE | 101 12 773 A1 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 079 631 A1 | 2/2001 |

(56) References Cited

FOREIGN PATENT DOCUMENTS

| | | |
|---|---|---|
| EP | 1 337 071 A2 | 8/2003 |
| EP | 1 670 150 | 6/2006 |
| EP | 1 753 249 | 2/2007 |
| EP | 1 950 962 A1 | 7/2008 |
| EP | 1 965 386 A1 | 9/2008 |
| EP | 1 965 389 A2 | 9/2008 |
| GB | 2 399 719 | 9/2004 |
| WO | WO 02/03728 | 1/2002 |
| WO | WO 03/009590 | 1/2003 |
| WO | WO 03/045064 | 5/2003 |
| WO | 2004/062183 A1 | 7/2004 |
| WO | WO 2004/062283 | 7/2004 |
| WO | WO 2006/046107 | 5/2006 |
| WO | WO 2006/066617 | 6/2006 |
| WO | WO 2006/084361 | 8/2006 |
| WO | WO 2007/046672 | 4/2007 |
| WO | WO 2007/114653 | 10/2007 |
| WO | WO 2008/042694 | 4/2008 |
| WO | 2008/100000 A1 | 8/2008 |
| WO | 2008/117981 A1 | 10/2008 |
| WO | WO 2009/016175 | 2/2009 |
| WO | WO 2010/000407 | 1/2010 |

OTHER PUBLICATIONS

ATSC Digital Television Standard (A/53) Revision E, Advanced Television Systems Committee, Dec. 27, 2005.
"ATSC-Mobile DTV Standard, Part 3-Service Multiplex and Transport Subsystem Characteristics", Advanced Television Systems Committee, Inc., Document A/153 Part 3:2009, Oct. 15, 2009, pp. 14-25.
ATSC Recommended Practice: Design of Synchronized Multiple Transmitter Networks (A/111), Advanced Television Systems Committee, Sep. 3, 2004.
ATSC Standard: Synchronization Standard for Distributed Transmission (A/110), Advanced Television Systems Committee, Jul. 14, 2004.
ATSC Standard: Synchronization Standard for Distributed Transmission, Revision A (A/110A), Advanced Television Systems Committee, Jul. 19, 2005.
ATSC Standard: Synchronization Standard for Distributed Transmission, Revision B (A/110B), Advanced Television Systems Committee (Dec. 24, 2007).
ATSC Technology Group Report: DTV Signal Reception and Processing Considerations, Doc. T3-600r4, Advanced Television Systems Committee, Sep. 18, 2003.
Battisa, "Spectrally Efficient High Data Rate Waveforms For The UFO SATCOM Channel", Military Communications Conference, MILCOM 98, Proceedings, Oct. 18-21, 1998, pp. 134-139, IEEE vol. 1.
Citta, R., et al., "ATSC Transmission System: VSB Tutorial", Zenith Electronics Corporation, Symposium Handout, Montreuz Symposium, Jun. 12, 1997.
"Digital Video Broadcasting (DVB); DVB Mega-Frame for Single Frequency Network (SFN) Synchronization", European Broadcasting Union; eTSI TS 101 191 v1.4.1, Jun. 2004.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.
Lecture 4: Digital Television the DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001.
Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520.
Whitaker, J. C., "Standard Handbook of Video and Television Engineering", Chapter 17.2 "ATSC DTV Received Systems", 2000, pp. 17-63 to 17-99.
"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.
"ATSC Digital Television Standard (A/53) Revision E with Amendment No. 1", Advanced Television Systems Committee, Apr. 18, 2006, pp. 45-91.
Yucek, T., et al., "A Survey of Spectrum Sensing Algorithms for Cognitive Radio Applications," IEEE Communications Surveys & Tutorials, Mar. 4, 2009, pp. 116-130, vol. 11, No. 1.
Peha, J. M., "Sharing Spectrum Through Spectrum Policy Reform and Cognitive Radio," Proceedings of the IEEE, Apr. 2009, pp. 708-719, vol. 97, No. 4.
Zhao, Y., et al., "Experimental Study of Utility Function Selection for Video Over IEEE 802.22 Wireless Regional Area Networks," 5th International Conference on Testbeds and Research Infrastructures for the Development of Networks & Communities and Workshops, 2009, Dates of Conference: Apr. 6-8, 2009, pp. 1-10.
Lee, J. M., et al., "Adaptive Hybrid Transmission Mechanism for On-Demand Mobile IPTV Over WiMax," IEEE Transactions on Broadcasting, Jun. 2009, pp. 468-477, vol. 55, No. 2.
Wen C. C., et al., "Hybrid Tree Based Explicit Routed Multicast for QoS Supported IPTV Service," Proceedings of the IEEE Global Telecommunications Conference, 2009, Dates of Conference: Nov. 30, 2009-Dec. 4, 2009, pp. 1-6.
Ding, J. W., et al., "Quality-Aware Bandwidth Allocation for Scalable On-Demand Streaming in Wireless Networks," IEEE Journal on Selected Areas in Communications, Apr. 2010, pp. 366-376, vol. 28, No. 3.
Sachs, J., et al., "Cognitive Cellular Systems Within the TV Spectrum," IEEE Symposium on New Frontiers in Dynamic Spectrum, 2010, Dates of Conference: Apr. 6-9, 2010, pp. 1-12.
Karimi, H. R., et al., "European Harmonized Technical Conditions and Band Plans for Broadband Wireless Access in the 790-862 MHz Digital Dividend Spectrum," IEEE Symposium on New Frontiers in Dynamic Spectrum, 2010, Dates of Conference: Apr. 6-9, 2010, pp. 1-9.
Lee et al., "ATSC Terrestrial Digital Television Broadcasting Using Single Frequency Networks", XP-002556814, ETRI Journal, vol. 26, No. 2, Apr. 2004, pp. 92-100.
"ATSC Digital Television Standard (Annex D), RF/Transmission Systems Characteristics", Advanced Television Systems Committee, Sep. 16, 1995, pp. 46-60.
"ATSC Mobile DTV Standard, Part 2—RF/Transmission System Characteristics", Advanced Television Systems Committee, Inc., Document A/153 Part 2: 2009, Oct. 15, 2009, (88 pages).

* cited by examiner

METHOD FOR IMPROVING THE DATA RATE OF MOBILE/HANDHELD DATA AND THE QUALITY OF CHANNEL ESTIMATION IN AN ATSC-M/H TRANSPORT DATA STREAM

CROSS REFERENCE TO RELATED APPLICATIONS

This application claims priority to U.S. Provisional Patent Application Ser. Nos. 61/162,275 filed Mar. 21, 2009, and 61/265,572 filed Dec. 1, 2009, which are hereby incorporated by reference in their entirety.

BACKGROUND OF THE INVENTION

1. Field

The invention generally relates to communication systems, and more particularly to improving the data rate of mobile data and the quality of channel estimation in an ATSC-M/H (Advanced Television Systems Committee—Mobile/Handheld) transport data stream.

2. Related Art

ATSC transport data stream content and function is described in U.S. patent application Ser. No. 11/276,473, entitled "APPARATUS, SYSTEMS AND METHODS FOR PROVIDING ENHANCEMENTS TO ATSC NETWORKS USING SYNCHRONOUS VESTIGIAL SIDEBAND (VSB) FRAME SLICING", filed Mar. 1, 2006 and U.S. Pat. No. 7,532,677, entitled "APPARATUS, SYSTEMS AND METHODS FOR PRODUCING COHERENT SYMBOLS IN A SINGLE FREQUENCY NETWORK", which issued on Sep. 27, 2007, both of which are hereby incorporated by reference in their entirety. In an ATSC-M/H transport data stream, transport data packets containing data for stationary (or "fixed" or "main stream") receivers and transport data packets containing data for M/H receivers are transmitted. As shown in FIG. 3, the data structure of an ATSC-M/H transport data stream is organized in ATSC-M/H data frames each containing 5 ATSC-M/H sub-frames. Each ATSC-M/H sub-frame is subdivided into 16 ATSC-M/H slots, where each slot contains 156 transport data packets. An ATSC-M/H slot (i.e., 156 transport data packets) can be filled with data for stationary receivers. Alternatively, an ATSC-M/H slot may contain 118 transport data packets with data for M/H receivers and 38 transport data packets of data for stationary receivers. The 118 transport data packets containing data for M/H receivers are referred to as an M/H group and a collection of M/H groups is referred to as an M/H parade which can carry one or two M/H ensembles. Each M/H ensemble represents a logical pipe for IP based datagrams of one television (TV) program or service.

The M/H ensembles carried by the M/H parades include a specific number of ATSC-M/H slots in an ATSC sub-frame. Also, a potential mobile TV carrier holding a FCC License outside the broadcast band (e.g., channels 2-51) may wish to use ATSC M/H. This mobile TV carrier is not restricted by the FCC in the use of bandwidth in the ATSC-M/H transport data stream and is not required to transmit a specific minimum rate of TV data for stationary receivers as are normal ATSC broadcasters (e.g., channel 2-51). Nevertheless, a TV carrier intending to transmit only data for M/H receivers is limited by the requirements of the current ATSC-M/H standard which defines the data structure of the ATSC-M/H transport data stream. If each ATSC-M/H slot of the M/H ensemble containing only data for stationary receivers is substituted by an ATSC-M/H slot containing a combination of 118 transport data packets for M/H receivers and 38 transport data packets for stationary receivers, only 75% of the total bandwidth can be used for transmitting data for M/H receivers.

As shown in FIG. 1, an ATSC-M/H slot of a coded ATSC-M/H transport data structure is organized in regions A, B, C and D, where each region contains one or more segments. Only region A provides training sequences (i.e., known symbol sequences to aid the M/H receiver's equalizer in channel estimation and to track fading channels known to exist in the mobile environment). The regions B, C and D are positioned symmetrically around region A do not provide training sequences. As a result, the transmission quality of an ATSC-M/H transmission is reduced in regions B, C, and D. Thus, in a time varying transmission channel the channel estimation, the signal equalization and the subsequent decoding is downgraded in time periods corresponding to the occurrence of segments in regions B, C and D in the ATSC-M/H transmission data stream.

What is needed is a method for increasing the total possible data rate available for M/H mobile services and improving the quality of channel estimation in an ATSC-M/H by introducing additional training sequences in transport data stream.

BRIEF DESCRIPTION OF THE INVENTION

The present invention meets the above-identified needs by using a portion or all of the 38 transport data packets of an ATSC-M/H slot originally designated to be used for transmitting data for stationary receivers for transmitting data for M/H receivers. This new mobile region is referred to herein as region E and is shown in FIG. 2 as the region corresponding to ATSC data for mobile receivers. The rate of transmitted data for M/H receivers in the ATSC-M/H transport data stream can be increased by using a portion of the 38 packets in region E for mobile, increasing in steps from the current 75% transmission rate for mobile up to 100% mobile. The transport data packets, whose contents are changed from data for stationary receivers to data for M/H receivers, are marked to indicate that the respective content in a stationary receiver should be ignored and that the respective content in a M/H receiver should be received and decoded.

In addition, training sequences containing marked transport data packets are introduced in segments of data fields in the coded transport data stream, particularly the coded ATSC-M/H transport data stream. The marked transport data packets can be positioned in segments of regions B, C, D and E of the coded transport data stream, which are originally not arranged with the training sequences. As a result, the training sequences are distributed throughout the coded transport data stream for better channel estimation and signal equalization. In addition, mobile data in each corresponding time period of the transmission also is correctly decoded.

The data for M/H receivers are inserted symmetrically starting in the center of the, e.g., 38 consecutively transmitted transport data packets region E originally determined for data for stationary receivers in an ATSC-M/H slot and expand outward. The data are separated by at least one or more transport data packet for stationary service on the edges of Region E as shown in FIG. 3 when the data rate for mobile is less than 100% and will consume the whole 38 packets with mobile when 100% of the data rate for mobile only is desired. The stationary packets are placed on the edges of the 38 packet region as shown in FIG. 3 to ensure the buffer model of the ATSC transport data stream is maintained for stationary receivers.

In a first example embodiment, training sequences are introduced into parts of the segments containing only the, e.g., 38 consecutively transmitted transport data packets originally designated for data for stationary receivers. Thus, only the, e.g., 38 consecutively transmitted transport data packets in an ATSC-M/H slot contain new training sequences are decoded in a comparable manner as the transport data packets transmitted in a region A (FIG. 1) which also carry training sequences.

In a second example embodiment, training sequences are introduced throughout regions B, C, D and E. Thus, the transport data packets throughout the ATSC-M/H slot (i.e., the transport data packets in, e.g., 118+38 packets) are decoded in a comparable manner as the transport data packets transmitted in region A (FIG. 1) of the coded ATSC-M/H transport data stream which carry native training sequences.

In one example aspect of the invention, the marking of transport data packets, whose contents are changed from data for stationary receivers to data for M/H receivers, is performed by using a value of the packet identifier (PID) in the header of the transport data packet, which is not occupied by the ATSC-M/H standard.

In another example aspect of the invention, the marking of transport data packets, whose contents are changed from data for stationary receivers to data for M/H receivers, is performed by using a transport data packet without any payload data, whose data point to the first and the last marked transport data packet.

In yet another example aspect of the invention, the marking of transport data packets, whose contents are changed from data for stationary receivers to data for M/H receivers, is performed by using values in a multiprotocol encapsulation (MPE) header of a protocol data unit (PDU) containing several MPEG2 transport data packets, which normally indicate the first and the last MPEG2 transport data packet of the PDU and which can be used for indicating the first and the last marked transport data packet.

In yet another example aspect of the invention, the marking of transport data packets, whose contents are changed from data for stationary receivers to data for M/H receivers, is performed by using the adaptation field in the MPEG2 transport data, which is not reserved for standardized content and which can be used for indicating the first and the last marked transport data packet.

The data for M/H receivers in that transport data packets, which are originally determined for stationary receivers, can be coded with the identical code in case of the transport data packets in an M/H group, e.g., with Reed-Solomon code in combination with a trellis-based serial-concatenated convolution code, or with a combination of a low-density-parity-check code and a Bose-Chaudhuri-Hocquenghen code.

BRIEF DESCRIPTION OF THE DRAWINGS

The features and advantages of the present invention will become more apparent from the detailed description set forth below when taken in conjunction with the following drawings.

DETAILED DESCRIPTION

Figure 1:
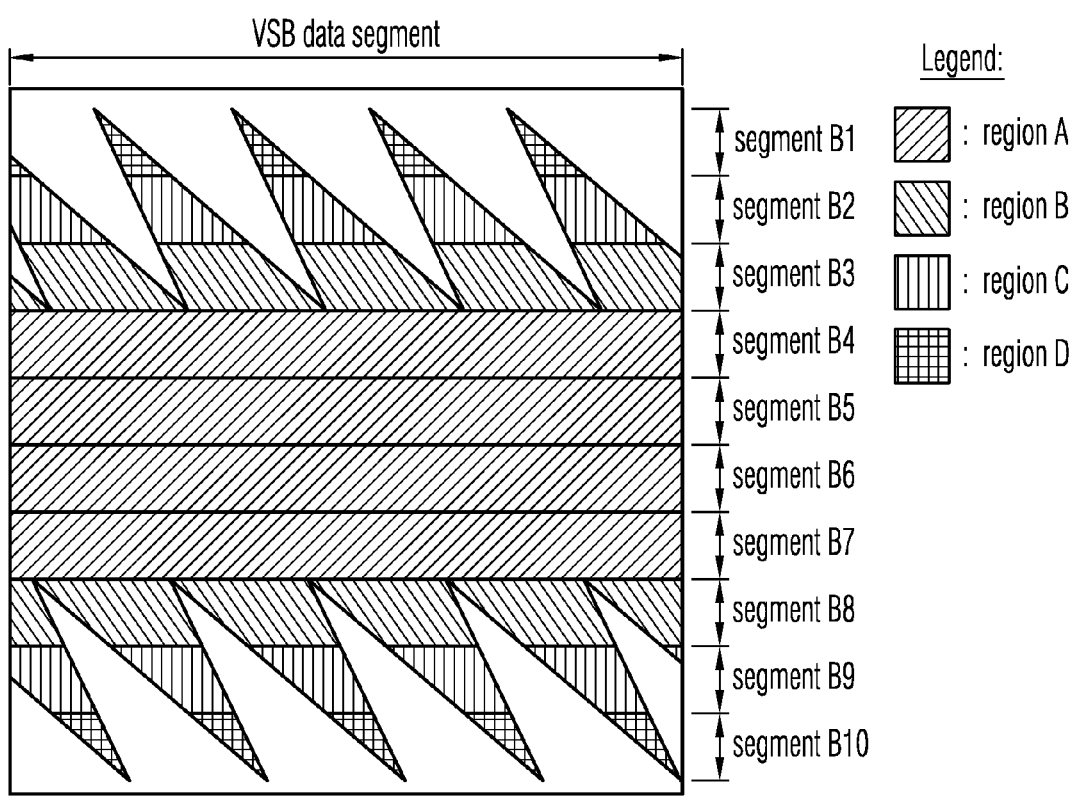
FIG. 1 shows a data structure of a time interval in a coded ATSC-M/H transport data stream.
Figure 2:
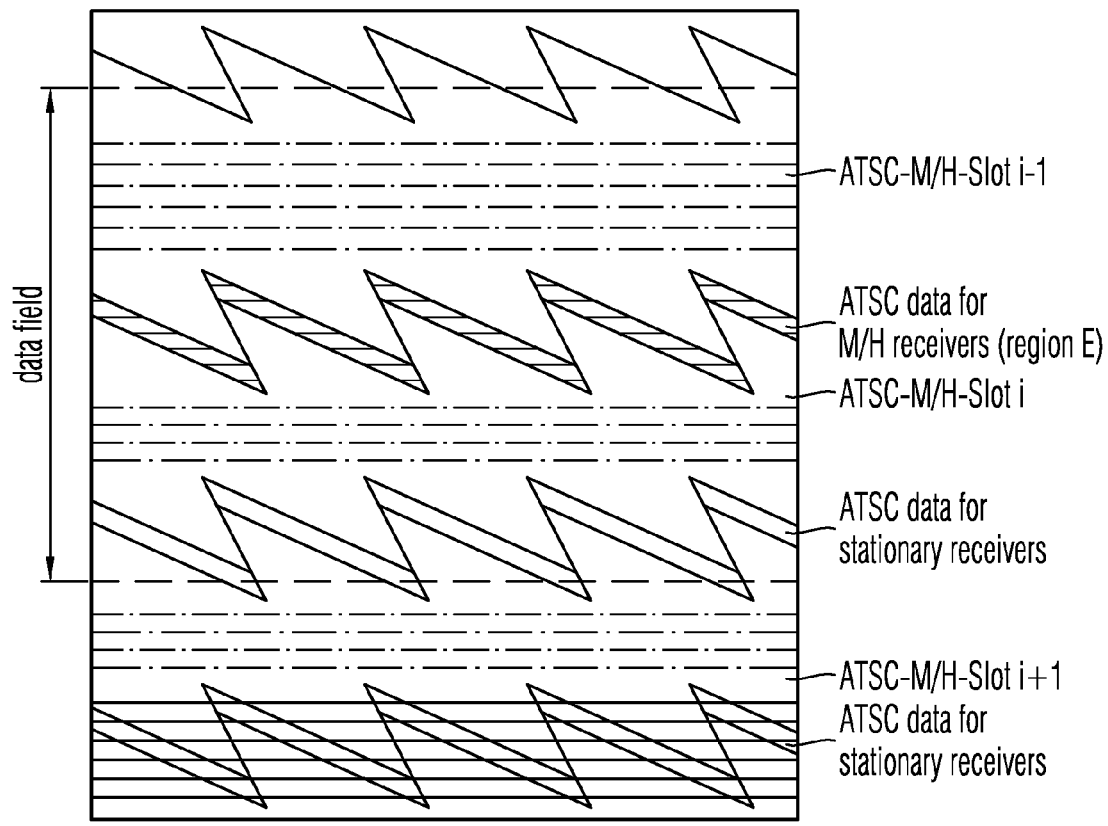
FIG. 2 shows a data structure of a time interval in an ATSC-M/H transport data stream.
Figure 4:
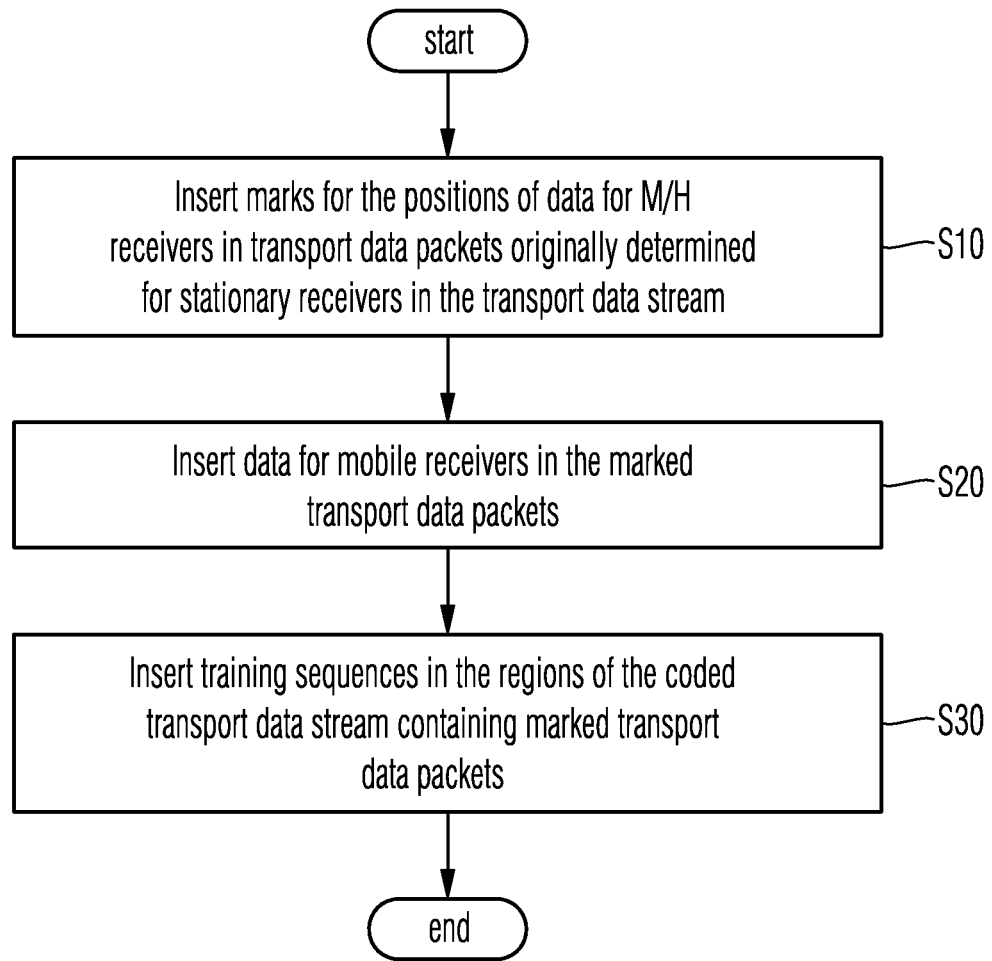
FIG. 4 depicts a flowchart of an exemplary process for improving the data rate of M/H data and the quality of channel estimation in an ATSC-M/H transport data stream.

Referring to FIGS. 2 and 4, initially in step S10, a predetermined number of consecutively transmitted transport data packets out of, e.g., 38 transport data packets in an ATSC-M/H slot originally designated for data for stationary receivers are marked for data for M/H receivers. Thus, more than 118 transport data packets of the respective ATSC-M/H slot are filled with data for M/H receivers in this example. The marked and consecutively transmitted transport data packets of the respective ATSC-M/H slot are positioned symmetrical to the center of the, e.g., 38 transport data packets originally designated for data for stationary receivers, referred to herein as region E.

Between the marked transport data packets and the, e.g., 118 transport data packets originally designated for data for M/H receivers, in the respective and in the subsequent ATSC-M/H slots enough transport data packets with data for stationary receivers are positioned to fulfill the requirements concerning underflow of the buffer for data for stationary receivers in the buffer model according to ISO/IEC 13818-1. The number of transport data packets with data for stationary receivers between the, e.g., 118 transport data packets originally determined for data for M/H receivers and the marked transport data packets depends on the data rate of the ATSC-M/H transport data stream at the output of the ATSC-M/H multiplexer and buffer size in the MPEG2 buffer model. Furthermore, the transport data packets filled with data for stationary receivers between the transport data packets filled with M/H receivers data can be used for transmitting a TV program with relatively little content or a forecast channel.

In a first example embodiment, the marking of the transport data packets is achieved by a specific value of the packet identifier (PID) in the header of the respective marked transport data packet, where the specific value of the packet identifier for marking the respective transport data packet is not yet reserved for other applications in the ATSC-M/H or MPEG2 standard.

In a second example embodiment, one transport data packet of the, e.g., 38 transport data packets originally determined for data for stationary receivers, which does not include any payload data, is used for marking the transport data packets. Instead of containing payload data, this transport data packet contains a pointer to the first and to the last marked transport data packet designated for data for M/H receivers in the respective ATSC-M/H-slot.

In a third example embodiment, the transport data packets provided for data for M/H receivers from the, e.g., 38 transport data packets originally determined for data for stationary receivers and representing each a MPEG2 transport data packet are assembled into a protocol data unit (PDU) and transported by a multi-protocol encapsulation method (MPE) in the transport layer. Furthermore, each PDU contains a multi-protocol encapsulation header with a pointer pointing to the first MPEG2 transport data packet and a pointer pointing to the last MPEG2 transport data packet of the PDU. Thus, in the transport layer, it is possible to use these two pointers in the multi-protocol encapsulation header of a PDU containing the marked transport data packets used for marking.

In a fourth example embodiment, the adaptation field in an MPEG2 transport data packet is used for marking a transport data packet originally determined for data for stationary receivers as a transport data packet for data for M/H receivers. If the adaptation field flag in the header of an MPEG2 transport data packet is set, the adaptation field is valid and can be used for transmitting any data. Thus, by setting the adaptation field flag in the header of the MPEG2 transport data packet the adaptation field of MPEG2 transport data packet can be used for inserting mark data marking the transport data packet as a container for M/H receiver data.

Figure 3:
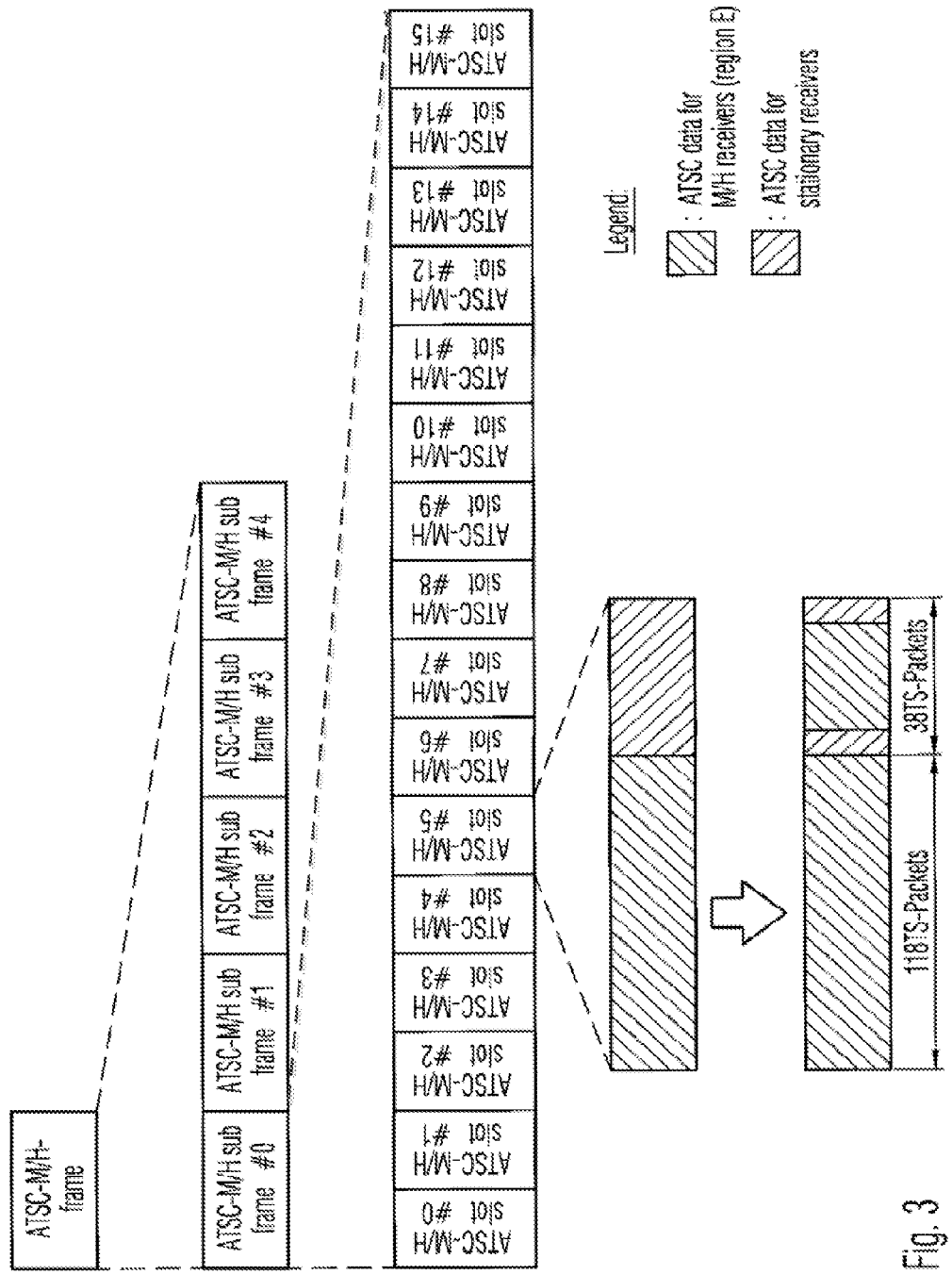
FIG. 3 shows a time diagram of an uncoded ATSC-M/H transport data stream.

In step S20, the supplementary data for M/H receivers are inserted in the marked transport data packets of the respective ATSC-M/H slot as shown in the last line in FIG. 3.

In the post-processor of an ATSC-M/H transmitter, the data for M/H receivers inserted in the marked transport data packets are coded using the identical code as for coding the data for M/H receivers in the 118 consecutively transmitted transport data packets of each M/H group, such as Reed-Solomon-block-code in combination with a Series-Concatenated-Convolutional-Code (SCCC) or with a Parallel-Concatenated-Convolutional-Code (PCCC). For improved error correction, the data for M/H receivers inserted in the marked transport data packets can be coded in a more robust and reliable code, for example by using a low-density-parity-check-code (LDPC-code) combined with a Bose-Chaudhuri-Hocquenghen-code (BCH-code).

The data for M/H receivers inserted in the marked transport data packets can only be decoded by ATSC-M/H receivers capable of recognizing the marked transport data packets containing supplementary data for M/H receivers.

In step S30, training sequences are inserted in the segments of regions B, C, D, and/or E which are near the border of the ATSC-M/H slots in the coded ATSC-M/H transport data stream.

In a fifth embodiment of the invention, the training sequences are only inserted in parts of the segments in Region E, which corresponds to the, e.g., 38 transport data packets originally determined for data for stationary receivers, as can be seen in the lines indicating training sequences and positioned only in the trapezoid areas of the coded ATSC-M/H transport data stream in the above part of the diagram in FIG. 2.

In a sixth embodiment of the invention, the training sequences are inserted throughout the segments belonging to regions B, C and D (see the below part of the diagram in FIG. 2). Thus, the training sequences are inserted in ranges of the coded ATSC-M/H transport data stream belonging to the 38 transport data packets originally determined for data for stationary receivers of the respective ATSC-M/H slot and to the transport data packets of the respective preceding ATSC-M/H slot and/or of the respective subsequent ATSC-M/H slot.

In one sub-embodiment of the invention, the training sequences can be inserted at both borders of the respective ATSC-M/H slot in the segments of regions B, C and D. In another sub-embodiment of the invention the training sequences can only be inserted at one border of the respective ATSC-M/H slot in the segments of regions typed B, C and D, i.e. at the border to the respective preceding ATSC-M/H slot or at the border to the respective subsequent ATSC-M/H slot.

The training sequences are inserted in the ATSC-M/H transport data stream by using a post processor to perform post processing between the interleaving and the 8-VSB-Trellis-encoding according to the ATSC-M/H standard. The training sequences are preceded by, e.g., 12 bytes for configuring the 8-VSB-trellis-encoder to a specific known starting state in which the 8-VSB-trellis-encoder begins encoding of the known training sequences in a code being specific for training sequences and that are known in advance to the M/H receiver.

The training sequences can only be decoded from ATSC-M/H receivers qualified for recognizing the training sequences positioned in the segments of regions B, C, D and or E.

The scope of the invention is not limited by the features of the embodiments described above. Other and especially future digital TV transmission standards combining the transmission of data for stationary and M/H receivers, which are not described herein, are inside the scope and the spirit of the present invention.

Software embodiments of the present invention may be provided as a computer program product, or software, that may include an article of manufacture on a machine accessible or machine- or computer-readable medium having instructions. The instructions on the machine accessible or machine- or computer-readable medium may be used to program a computer system or other electronic device. The machine- or computer-readable medium may include, but is not limited to floppy diskettes, optical disks, CD-ROMs and magneto-optical disks or other types of media/machine/computer-readable medium suitable for storing or transmitting electronic instructions.

The techniques described herein are not limited to any particular software configuration. They may find applicability in any computing or processing environment. The terms "machine accessible medium", "machine-readable medium" and "computer-readable medium" used herein shall include any medium that is capable of storing, recording or transmitting a sequence of instructions for execution by the machine and that cause the machine to perform any one of the methods described herein. Furthermore, it is common in the art to speak of software, in one form or another (e.g., program, procedure, process, application, module, unit, logic and so on) as taking an action or causing a result. Such expressions are merely a shorthand way of stating that the execution of the software by a processing system causes the processor to perform an action to produce a result.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are familiar with patent and legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A method for increasing a data rate of data available for mobile/handheld (M/H) receivers and for improving quality of channel estimation and equalization in mobile fading for M/H receivers containing a transport data stream, comprising:

marking a number of consecutively transmitted transport data packets determined for transmission of data for M/H receivers in a predetermined number of N consecutively transmitted transport data packets in a slot of a transport data stream to designate a portion of the N consecutively transmitted transport data packets for data for M/H receivers, the slot being originally determined for data for M/H receivers and data for stationary receivers and the N consecutively transmitted transport data packets being originally determined for transmission of data for stationary receivers;

inserting coded data for M/H receivers in the marked transport data packets, wherein the consecutively transmitted transport data packets determined for transmission of data for M/H receivers are inserted symmetrically to a center of the N consecutively transmitted transport data packets and separated from M transport data packets of an actual or a subsequent slot determined for data for M/H receivers by at least one transport data packet; and introducing training sequences in segments of data fields of the transport data stream containing marked transport data packets.

2. The method according to claim 1, wherein the training sequences are introduced only in parts of the segments containing N consecutively transmitted transport data packets in the slot originally determined for transmission of data for stationary receivers with at least one marked transport data packet.

3. The method according to claim 1, wherein the training sequences are introduced in parts of the segments containing N consecutively transmitted transport data packets in the slot originally determined for transmission of data for stationary receivers with at least one marked transport data packet and in parts of the segments belonging to a preceding or a subsequent slot.

4. The method according to claim 1, wherein the marking of the transport data packets determined for transmission of data for M/H receivers is performed in an adaptation field in a header of the transport data packets.

5. The method according to claim 1, wherein the transport data stream is an ATSC-M/H transport data stream and the slot is an ATSC-slot.

6. The method according to claim 5, wherein the marking of the transport data packets determined for transmission of data for M/H receivers is performed by a value of a packet identification (PID) in a header of the transport data packets not referenced by the ATSC standard.

7. The method according to claim 1, wherein the marking of the transport data packets determined for transmission of data for M/H receivers is performed by a transport data packet of the N consecutively transmitted transport data packets without any payload data.

8. The method according to claim 1, wherein the marking of the transport data packets determined for transmission of data for M/H receivers is performed by a pointer in a header of a protocol data unit produced by a multi-protocol encapsulation method.

9. The method according to claim 1, wherein the coded data for M/H receivers inserted in the marked transport data packets are coded by an identical code for coding data in the M transport data packets of a slot determined for data for M/H receivers.

10. The method according to claim 9, wherein M equals 118.

11. The method according to claim 1, wherein the coded data for M/H receivers inserted in the marked transport data packets are coded by means of a code with high robustness and high reliability.

12. The method according to claim 11, wherein the code is a low-density-parity-check-code in combination with a Bose-Chaudhuri-Hocquenghen-code.

13. The method according to claim 1, wherein N equals 38.

* * * * *

UNITED STATES PATENT AND TRADEMARK OFFICE
CERTIFICATE OF CORRECTION

PATENT NO. : 8,982,745 B2  
APPLICATION NO. : 12/727478  
DATED : March 17, 2015  
INVENTOR(S) : Zurek-Terhardt et al.

Page 1 of 1

It is certified that error appears in the above-identified patent and that said Letters Patent is hereby corrected as shown below:

In the Specification

COLUMN 2

Line 9, "are" should be deleted.  
Line 13, "time varying" should read -- time-varying --.  
Line 14, "is" should read -- are --.

COLUMN 4

Line 47, "a" should be deleted.

COLUMN 6

Line 19, "machine accessible" should read -- machine-accessible --.

Signed and Sealed this  
Eighteenth Day of August, 2015

Michelle K. Lee  
*Director of the United States Patent and Trademark Office*